(12) United States Patent
Hasegawa et al.

(10) Patent No.: US 6,804,854 B2
(45) Date of Patent: Oct. 19, 2004

(54) WINDSHIELD WIPER DEVICE MOUNTING WASHER NOZZLE AND HOSE

(75) Inventors: Takashi Hasegawa, Kosai (JP); Atsuo Suzuki, Hamakita (JP); Kazuhide Kumo, Hamamatsu (JP); Tomonori Iso, Koga (JP)

(73) Assignees: Asmo Co., Ltd., Shizuoka (JP); Nippon Wiper Blade Co., Ltd., Saitama (JP)

( * ) Notice: Subject to any disclaimer, the term of this patent is extended or adjusted under 35 U.S.C. 154(b) by 156 days.

(21) Appl. No.: 10/095,076

(22) Filed: Mar. 12, 2002

(65) Prior Publication Data

US 2002/0133893 A1 Sep. 26, 2002

(30) Foreign Application Priority Data

Mar. 23, 2001 (JP) ........................................ 2001-085954
Apr. 4, 2001 (JP) ........................................ 2001-106260

(51) Int. Cl.[7] ................ B60S 1/32; B60S 1/46
(52) U.S. Cl. ................ 15/250.04; 15/250.351; 239/284.1
(58) Field of Search .................. 15/250.351, 250.352, 15/250.04; 239/264.1

(56) References Cited

U.S. PATENT DOCUMENTS

| | | | | |
|---|---|---|---|---|
| 3,916,473 A | * | 11/1975 | Williams | 15/250.04 |
| 5,046,215 A | * | 9/1991 | Kobayashi | 15/250.203 |
| 5,327,614 A | * | 7/1994 | Egner-Walter et al. | 15/250.04 |
| 5,398,370 A | * | 3/1995 | Gorner et al. | 15/250.04 |
| 5,430,909 A | * | 7/1995 | Edele et al. | 15/250.351 |
| 5,724,699 A | * | 3/1998 | Bexten | 15/250.04 |
| 5,903,953 A | * | 5/1999 | Dimur et al. | 15/250.4 |
| 6,094,772 A | | 8/2000 | West | 15/250.04 |

FOREIGN PATENT DOCUMENTS

JP    U-61-97059    6/1986

* cited by examiner

Primary Examiner—Gary K. Graham
(74) Attorney, Agent, or Firm—Posz & Bethards, PLC

(57) ABSTRACT

An arm head of a windshield wiper device is provided on a backside thereof with an undulated groove formed by sidewalls. The sidewalls have plural hill portions protruding in opposite directions alternately in a width direction of the arm head so as to be opposed to one another in a longitudinal direction thereof. Tops of the hill portions on one width side of the arm head are integrally provided at upper surfaces thereof with projections extending perpendicularly to a depth direction of the groove to overhang the groove. A hose for delivering washer liquid to a washer nozzle is accommodated in the groove and firmly held by the hill portions and the projections without using an extra part such as a clip.

13 Claims, 7 Drawing Sheets

WINDSHIELD WIPER DEVICE MOUNTING WASHER NOZZLE AND HOSE

CROSS REFERENCE TO RELATED APPLICATION

This application is based upon and claims the benefit of priority of Japanese Patent Applications No. 2001-85954 filed on Mar. 24, 2001 and No. 2001-106260 filed on Apr. 4, 2001, the contents of which are incorporated herein by reference.

BACKGROUND OF THE INVENTION

1. Field of the Invention

The present invention relates to windshield wiper device mounting a washer nozzle and a washer hose, in particular, suitable for cleaning a windshield glass of a vehicle.

2. Description of Related Art

Vehicle windshield wiper device for wiping a windshield glass has a wiper arm and a wiper blade attached to the wiper arm.

The wiper arm has an arm head whose one end is fixed to a pivot shaft, a retainer whose one end is pivotally connected via a holding pin to the other end of the arm head to enable a given angle rotation about an axis of the pin, a spring retained between the arm head and the retainer for resiliently biasing the retainer toward the windshield glass, and an arm piece fixed to the other end of the retainer. An end of the arm piece terminates in a U shaped hook for connecting with the wiper blade. The wiper blade has a blade rubber for contacting and wiping the windshield glass and a plurality of levers holding the blade rubber.

When the vehicle windshield wiper device is operated, the wiper arm and the wiper blade make well known reciprocating and rotating movements for removing raindrops on the windshield glass.

Further, in a vehicle having a larger windshield glass in which a washer nozzle mounted on a hood of the vehicle is located relatively far from an aimed point of the windshield glass which washer liquid from the washer nozzle strikes, the washer nozzle is mounted on the wiper arm or wiper blade for delivering the washer liquid to the aimed point without fail, as shown in JP-U-61-97059 which discloses the windshield wiper device with a washer nozzle and the washer fluid hose that are attached to the wiper arm.

According to the windshield wiper device proposed in JP-U-61-97059, a wiper head is provided on a backside thereof with a straight-line groove and a washer liquid hose is fitted in the groove. This structure has an advantage that the hose is properly routed through the groove and is out of sight from the user.

However, the hose mounting structure mentioned above has a drawback that, if the hose is pulled longitudinally by a force applied from outside or generated according to the rotation of the wiper arm, the hose is prone to slip out of the groove since the hose is deformed to take the shortest route in a longitudinal direction of the wiper arm. Therefore, even if the groove is provided, a clip or clips as extra parts for holding the hose in place become necessary to prevent the hose from slipping out of the groove. The use of the extra parts and extra assembly steps thereof are costly.

SUMMARY OF THE INVENTION

An object of the present invention is to provide a windshield wiper device in which a washer hose for delivering washer liquid to a washer nozzle mounted on a wiper arm or a wiper blade is firmly held by an arm head without using extra parts and with fewer assembly steps.

Another object of the present invention is to provide an apparatus of manufacturing the arm head for firmly holding the hose with less operating time and manufacturing cost.

To achieve the former object mentioned above, the windshield wiper device has a pivot shaft, a wiper arm, a wiper blade, a washer nozzle and a washer hose. The wiper arm has an arm head whose one end is fixed to the pivot shaft to rotate about an axis of the pivot shaft, a retainer whose one end is pivotally connected via a holding pin to the other end of the arm head to enable a given angle rotation about an axis of the pin, an arm piece whose one end is fixed to the other end of the retainer and whose the other end is pivotally connected with the wiper blade. The wiper hose is arranged along the arm head and the retainer for connecting with the washer nozzle to deliver washer liquid thereto.

With the arm head mentioned above, the arm head is provided with an undulated groove defined by groove sidewalls having at least first and second hill portions that protrude opposite to each other in a width direction of the arm head and are located adjacent to each other in a longitudinal direction thereof. A length between tops of the first and second hill portions in the width direction of the arm head is shorter than a diameter of the hose, or, preferably, is less than zero.

The hose accommodated in the groove comes in frictional engagement with peripheries of the tops of the first and second hill portions when a force pulls the hose in a longitudinal direction of the arm head. Accordingly, this groove shape is effective to prevent the hose from slipping out of the groove in a longitudinal direction of the arm head. Further, as the force to pull the hose is larger, the frictional resistance between the hose and the hill portions is larger so that the hose is firmly held in the groove.

It is preferable that the groove sidewalls further have a first dale portion that are opposed to the first hill portion in the width direction of the arm head and continuously adjacent to the second hill portion in the longitudinal direction thereof.

It is more preferable that the groove side walls further have a third hill portion protruding oppositely to the first hill portion in a width direction of the arm head and being located continuously adjacent to the first dale portion on a side opposite to the second hill portion in the longitudinal direction thereof.

Preferably, at least one of the tops of the first, second and third hill portions, preferably, each of the tops of the second and third hill portions, is provided at an upper surface thereof with a projection protruding in the width direction of the arm head so as to overhang the groove. The projection or projections prevent the hose inserted into the groove from coming off the groove. In particular, when a force acts on the hose in a longitudinal direction of the groove, the hose is fitted deep into the groove so that the hose is more deeply held in the groove.

The arm head is generally manufactured by injection molding in such a manner that molten metal or resin is injected into split die. The split die is separable into two pieces in opposite directions and parallel to an axial direction of a hole into which the pivot shaft is inserted and fixed. The groove just behind the projection constitutes an undercut portion so that, to form the groove just behind the projection, a slide die moving perpendicularly to a moving direction of the split die is required.

It is preferable that the slide die is located on a side of a periphery of the arm head, a distance from which in the width direction thereof to one of the tops of the first and second hill portions is shorter than that to the other of the tops of the first and second hill portions. Accordingly, a moving stroke of the slide die is shorter so that a time required for manufacturing the arm head is shorter.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
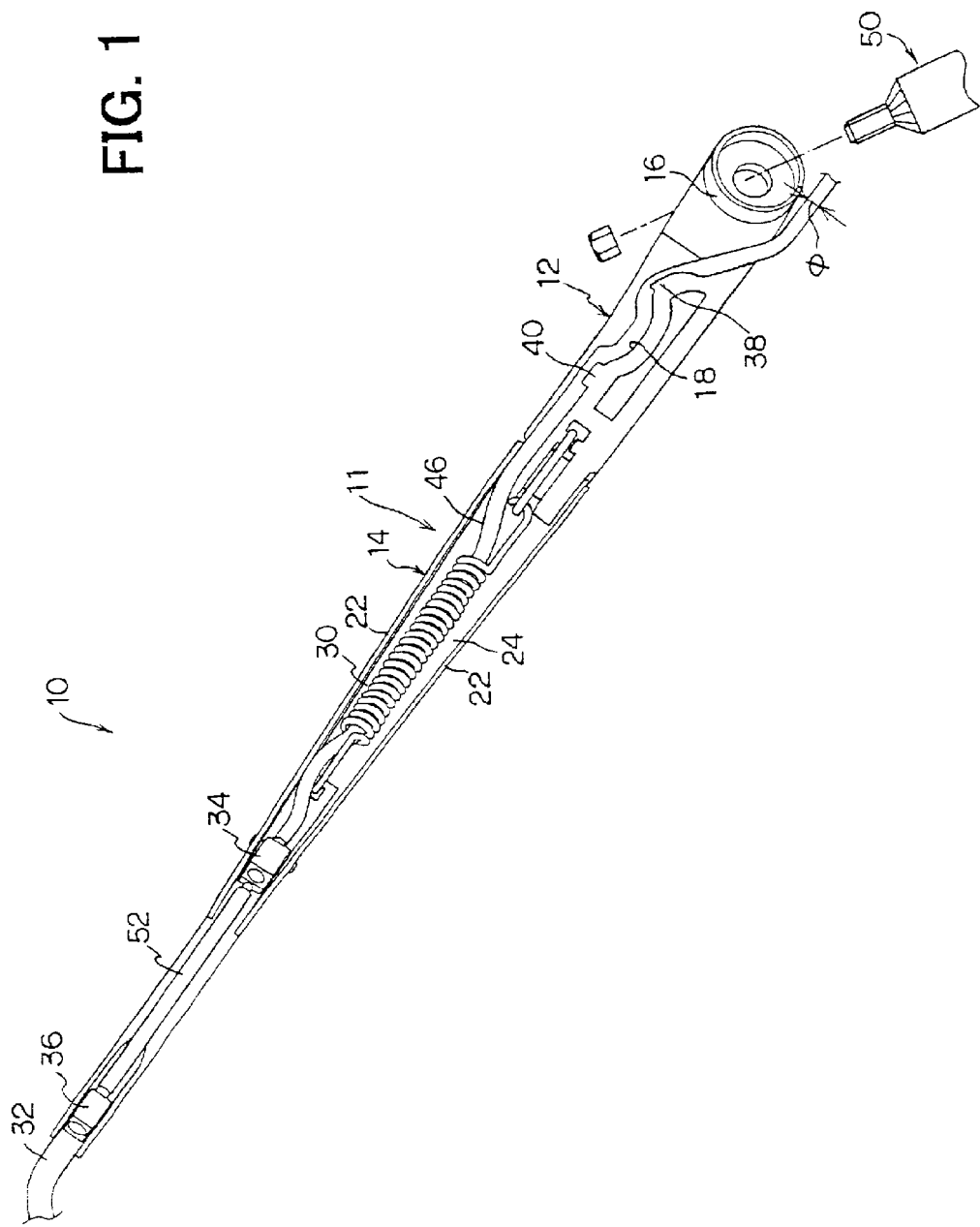
FIG. 1 is a backside view of a wiper arm constituting a part of a windshield wiper device according to a first embodiment of the present invention.
Figure 2A:
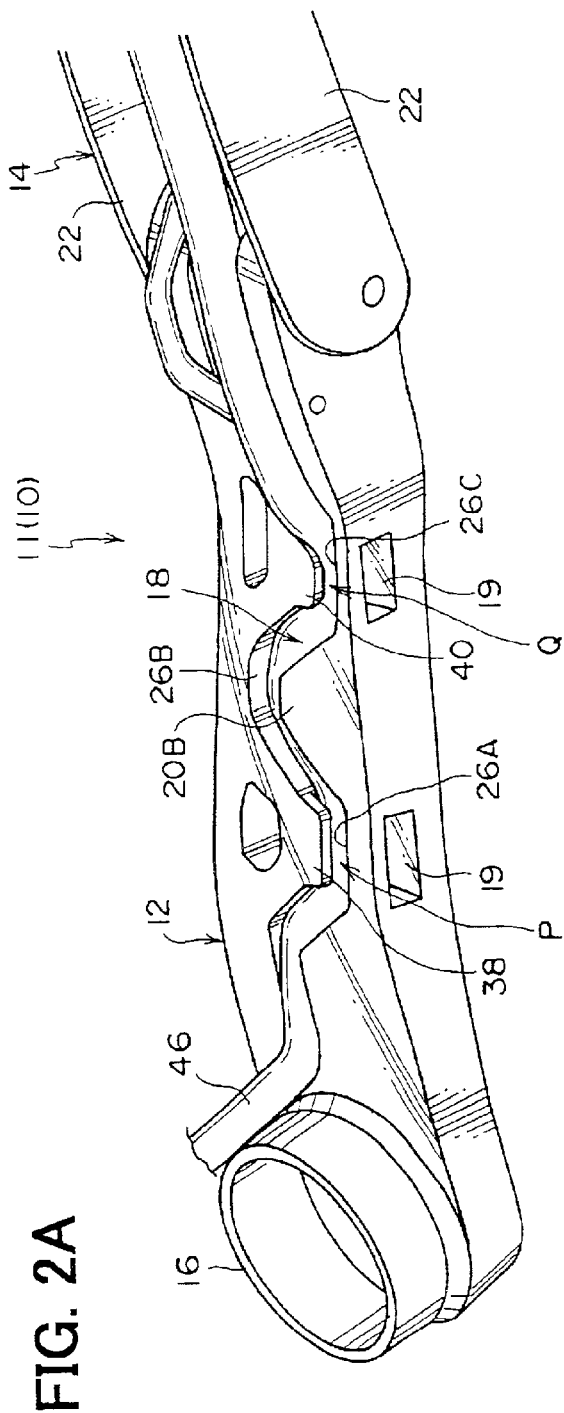
FIG. 2A is a perspective backside view of an arm head as a part of the wiper arm of FIG. 1.
Figure 2B:
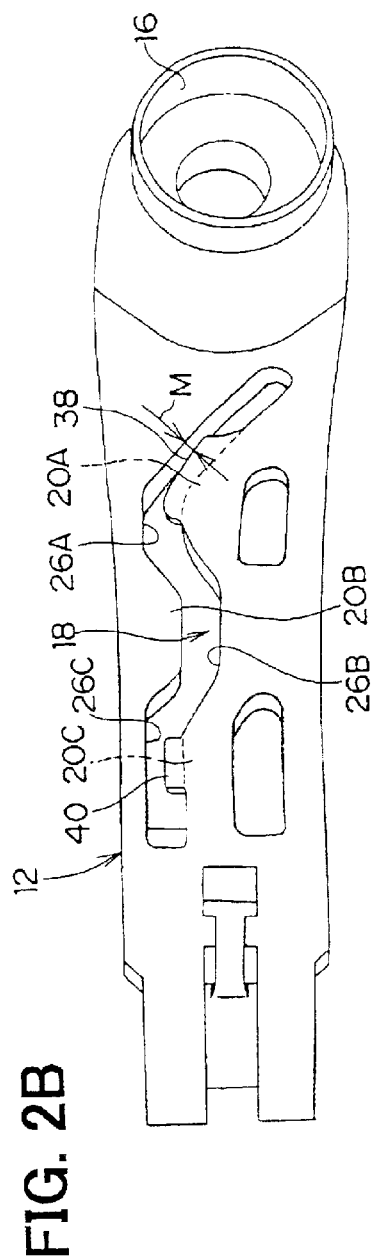
FIG. 2B is a plan view of the arm head of FIG. 2A.

Preferred embodiments of the present invention are described with reference to figures attached hereto.
First Embodiment FIG. 1 shows a backside of a wiper arm constituting a part of a windshield wiper device according to a first embodiment of the present invention. FIG. 2A is a perspective view of a backside of an arm head as a part of the wiper arm of FIG. 1. FIG. 2B is a plane view of the arm head of FIG. 2A.

A windshield wiper device 10 has a wiper arm 11 driven through a pivot shaft 50 by a power source such as wiper motor (not shown) and a wiper blade (not shown) to be attached to the wiper arm 11 for wiping a windshield glass (not shown). Since the power source, the wiper blade and the windshield glass are well known, the structures thereof are not be elaborated for the sake of brevity.

The wiper arm 11 has an arm head 12, a retainer 14, and an arm piece 32. The retainer 14 and the arm piece 32 constitute an arm element. An end of the arm head 12 is fixed to the pivot shaft 50, which is rotatably attached to a vehicle body, so that the arm head 12 rotate always together with the pivot shaft 50. As shown in FIG. 2, the arm head 12 is provided at an end on a backside thereof with a skirt 16 surrounding the pivot shaft 50 and at a center on a backside thereof with an elongated and undulated groove 18 extending longitudinally. Opposed side walls forming the groove 18 are waved to constitute hill portions (second, first and third hill portions) 20A, 20B and 20C and dale portions (second, first and third dale portions) 26A, 26B and 26C which face alternately each other so that the groove 18 is formed in an undulated shape. A part of a washer hose 46 is accommodated and held in the groove 18 along a longitudinal direction thereof.

The other end of the arm head 12 is pivotally connected to an end of the retainer 14 via a holding pin (not shown) so that the retainer 14 rotates about an axis of the holding pin by a given angle in a direction coming near or away from the windshield glass. The retainer 14, whose cross section is formed in one side opened square shape and whose backside is opened toward the windshield glass, has a pair of sidewalls 22 and an upper wall 24.

A tension coil spring 30, which is mainly positioned in a cavity of the one side opened square shaped retainer 14, is retained between the retainer 14 and the arm head 12 and urges always the retainer 14 toward the windshield glass.

An end of the arm piece 32 is fixed to the other end of the retainer 14. The other end of the arm piece 32 is terminated in a U shaped hook (not shown), which interconnects the wiper blade via a clip (not shown). The retainer 14 and the arm piece 32 may be simultaneously manufactured and integrated into one body.

Intermediate and leading end washer nozzles 34 and 36 are mounted on the wiper arm 11, respectively. The intermediate and leading end washer nozzles 34 and 36, which are held unrotatably by the retainer 14, are positioned between the sidewalls 22 inside the retainer 14 at longitudinally intermediate and leading end positions thereof, respectively.

The intermediate washer nozzle 34 is connected to an end of the hose 46, whose the other end is connected via a washer pump (not shown) to a washer tank (not shown) mounted inside the hood of the vehicle body. The hose 46 is drawn out from the hood to outside through a hose aperture (not shown) of the vehicle body, which is provided in a vicinity of the pivot shaft 50, and, after being introduced to the backside of the arm head 12, inserted into the groove 18 so that the hose 46 is held in the groove 18. Then, the hose 46 extends toward the intermediate washer nozzle 34 in and along a cavity formed by the sidewalls 22 of the retainer 14 in such a manner that the hose 46 passes through a coil center hole of the spring 30. Further, the intermediate washer nozzle 34 is connected to an end of an auxiliary hose 52, whose the other end is connected to the leading end washer nozzle 36. Thus, the washer liquid is delivered to the intermediate washer nozzle 34 via the hose 46 and to the leading end washer nozzle 36 via the auxiliary hose 52.

Figure 3:
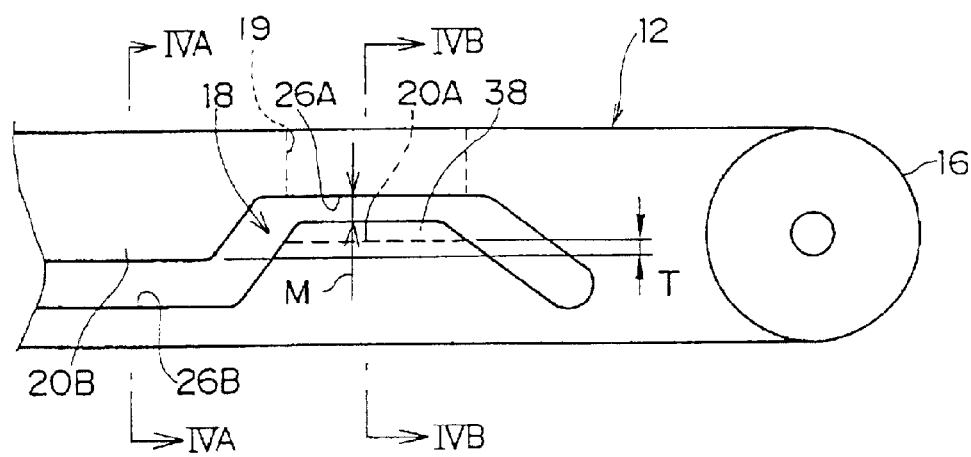
FIG. 3 is a schematic view of groove sidewalls constituting a groove according to the first embodiment.

FIG. 3 shows a schematic view of adjacent hill portions 20A and 20B forming the groove 18.

As shown in FIG. 3, a distance T perpendicular to a longitudinal direction (in a width direction) of the groove 18 between tops of the hill portions 20A and 20B, which are opposed to each other in the width direction of the groove 18 (in a width direction of the arm head 12) and adjacent to each other in a longitudinal direction of the groove 18 (in a longitudinal direction of the arm head), is shorter than a diameter φ of the hose 46. Accordingly, even if a force acts on the hose 46 in the longitudinal direction of the groove 18 so that the hose 46 is pulled to deform in a straight line, the hose 46 comes in frictional engagement with peripheries of the tops of the hill portions 20A and 20B.

Preferably, the distance T is zero, more preferably, less than zero. As the tops of the hill portions 20A and 20B are more overlapped in the width direction of the groove 18, the hose 46 to be held in the groove 18 is more undulated so that, when the hose 46 is pulled in the longitudinal direction of the groove 18, a friction between the hose 46 and the hill portions 20A and 20B is larger.

As mentioned above, if the arm head 12 is provided with at least two of the hill portions, or, more preferably, two pairs of the hill and dale portions among the hill portions 20A, 20B and 20C and the dale portions 26A, 26B and 26C, it is effective to prevent the hose 46 from slipping out of the groove 18 in a longitudinal direction of the groove 18 when the force pulls the hose 46 in a longitudinal direction of the groove 18.

Figure 4A:
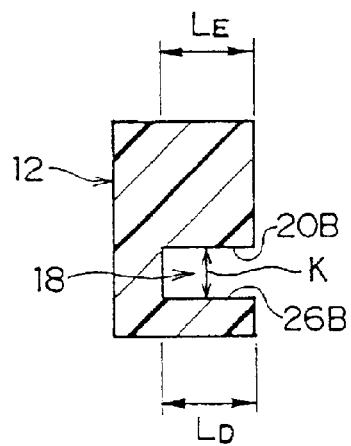
FIG. 4A is a cross sectional view taken along a line IVA—IVA of FIG. 3.
Figure 4B:
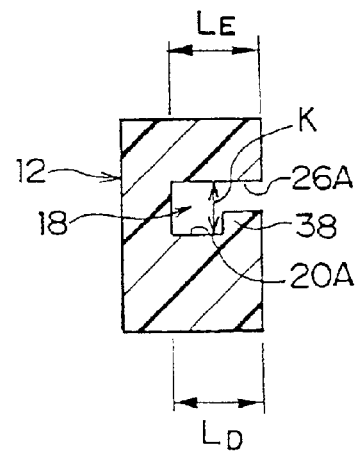
FIG. 4B is a cross sectional view taken along a line IVB—IVB of FIG. 3.

Further, as more clearly shown in FIG. 4B, each of the hill portions 20A and 20C is provided on an opening side of the groove 18 (at an upper surface thereof) with a projection 38 or 40 extending perpendicularly toward each of the dale portions 26A and 26C opposed thereto to overhang the groove so that a cross section of the groove 18 at this position is shaped a letter L.

Furthermore, as shown in FIGS. 4A and 4B, a length $L_D$ in a groove depth direction from a bottom of the groove 18 to an upper surface of the sidewall having the projection 38 or 40 is substantially equal to or, preferably, shorter than a length $L_E$ in a groove depth direction from the bottom of the groove 18 to an upper surface of the sidewall opposed to the projection 38 or 40.

Moreover, as shown in FIGS. 2B and 3, a length M (Width of the groove 18) between each free end of the projections 38 and 40 and each sidewall (the dale portion 26A or 26C) opposed to the projections 38 and 40 is smaller than the diameter of the hose 46.

Further, it is preferable, as shown in FIGS. 4A and 4B, that a width K of the groove 18 is larger than the diameter of the hose 46. In this case, since the hose 46, once having been inserted into the groove 18, is not pressed to deform by the opposed sidewalls unless the hose 46 is pulled in a longitudinal direction of the groove 18.

According to the windshield wiper device 10 mentioned above, the rotation of the pivot shaft 50 causes the reciprocal rotating movement of the wiper arm 11, so the wiper blade swings so as to remove the raindrops on the windshield glass.

Since the intermediate and leading end washer nozzles 34 and 36 are mounted on the wiper arm 11, the washer liquid jets from the intermediate and leading end washer nozzles 34 and 36 can strike the windshield glass in the aimed positions to be wiped by the wiper blade, even if the wiping range of the wiper blade is widely spread.

Further, since the width M of the groove 18 between each free end of the projections 38 and 40 and each sidewall (the dale portion 26A or 26C) opposed to the projections 38 and 40 is smaller than the diameter of the hose 46, the hose 46 is once deformed into an elongated shape when the force is inserted into the groove 18. However, the hose 46 is returned to an original shape due to its own elasticity after having been inserted into the groove 18 since the width K of the groove 18 is larger than the diameter of the hose 46 so that the hose 48 never slips out of the groove 18 and is firmly and stably held in the groove 18.

Furthermore, when a force acts on the hose 46 in the longitudinal direction of the groove 18 so that the hose 46 is pulled to deform in a straight line, the hose 46 comes in frictional contact with the top peripheries of the hill portion 20A, 20B and 20C since the groove 18 is formed substantially in a continuous wave shape by the hill portions 20A, 20B and 20C and dale portions 26A, 26B and 26C which face alternately each other. Accordingly, the hose 46 is prevented from slipping out of the groove 18 in a longitudinal direction of the groove 18. As the force to pull the hose 46 is larger, the frictional resistance between the hose 46 and the hill portions 20A, 20B and 20C is larger. Thus, the hose 43 is firmly and stably held in place in the groove 18 even if the hose 46 is pulled longitudinally by the force applied from outside or generated according to the rotation of the wiper arm 11.

Moreover, since each of the projection 38 and 40 is provided at each of the hill portions 20A and 20C to form the groove 18 in a letter L shape, the projections 38 and 40 prevent the hose 46 inserted into the L shaped groove 18 from coming off the groove 18. In particular, when a force acts on the hose 46 in a longitudinal direction of the groove 18, the hose 46 is fitted deep into the L shaped groove 18 so that the hose 46 is more deeply held in the groove 18.

Figure 5:
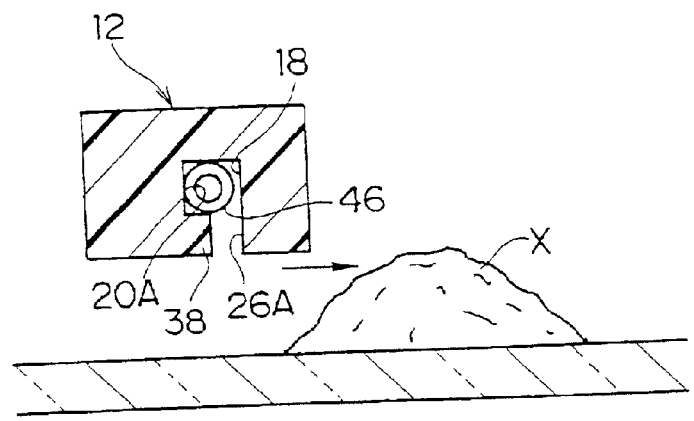
FIG. 5 is a view showing a possibility that a projection according to the first embodiment may hit an iced snow stack.

Further, as shown in FIG. 5, when the arm head 12 hits an iced snow stack X between the arm head 12 and the windshield glass according to the swing movement of the wiper arm 11, the projection 38 or 40 is prone to be damaged, if directly hits the iced snow stack X, since the thickness of the projection 38 or 40 in a groove depth direction is relatively thin. Accordingly, it is preferable that the length $L_D$ is shorter than the length $L_E$ to avoid the direct collision of the projection 38 or 40 with the iced snow stack.

Figure 6:
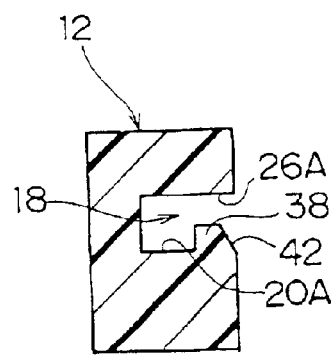
FIG. 6 is a cross sectional view of a modification of FIG. 4B.

Furthermore, as shown in FIG. 6, the projection 38 or 40 may be provided at a periphery thereof with a chamfering portion 42. The chamfering portion 42 prevents the iced snow stack from scratching the projection 38 or 40 so that the projection 38 or 40 is hardly damaged.

Moreover, the width K of the groove 18 may be smaller than the diameter of the hose 46. In this case, the hose 46, which has been inserted into the groove 18, is elastically deformed to elongate in a depth direction of the groove 18 so that the hose 46 is sandwiched between and held firmly by the opposed sidewalls of the grooves 18. This will serve to hold the hose 46 in space in the groove 18 even without providing the projection 38 or 40.

According to the windshield wiper device mentioned above, the hose 46 is held in the groove 18 without using a conventional clip or clips as an extra part, which prevents the hose from slipping out of the groove, with fewer assembly steps.

The arm head 12 is generally manufactured by injection molding in such a manner that molten metal or resin is injected into dies. The dies are separable into two pieces in opposite directions and parallel to an axial direction of a hole into which the pivot shaft 50 is inserted and fixed. The groove 18 just behind the projection 38 or 40 constitutes an undercut portion so that, to form the groove 18 just behind the projection 38 or 40, a slide die moving perpendicularly to a moving direction of the split dies is required. If a projection similar to the projection 38 or 40 is provided at the hill portion 20B, another slide die moving in an opposite direction to the former slide die is necessary so that the die equipment is costly and the arm head 12 is obliged to have holes 19, which are formed by the sliding movement of the slide dies, on opposite sides thereof, resulting in an unattractive appearance.

The windshield wiper device 10 according to the first embodiment has projections 38 and 40 protruding in a width direction of the groove 18 out of the hill portions 20A and 20C which are located only on one side of the sidewalls forming the groove 18. Accordingly, the slide die arranged only on one width side of the groove 18 is required so that the die apparatus is inexpensive and the arm head 12 keeps an attractive appearance since the holes 19 open only to the one width side of the groove 18, as shown in FIG. 2A.

An apparatus of manufacturing the arm head 12 by injection molding is described below.

Figure 7:
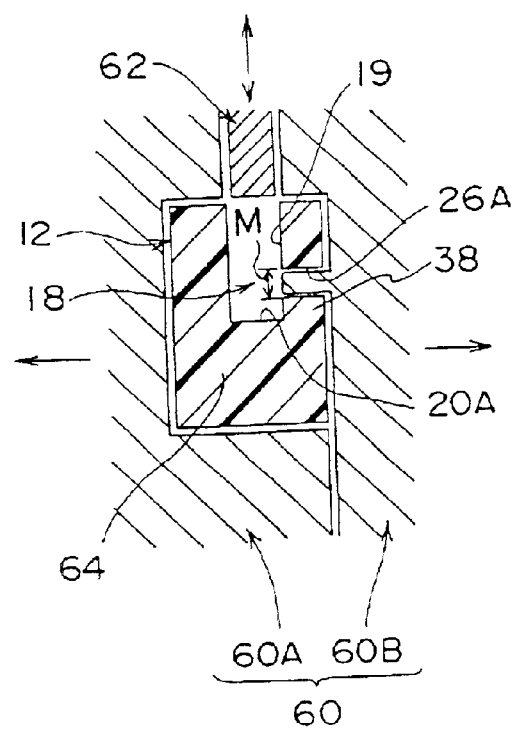
FIG. 7 is a cross sectional view of an apparatus of manufacturing the arm head according to the first embodiment.
Figure 8:
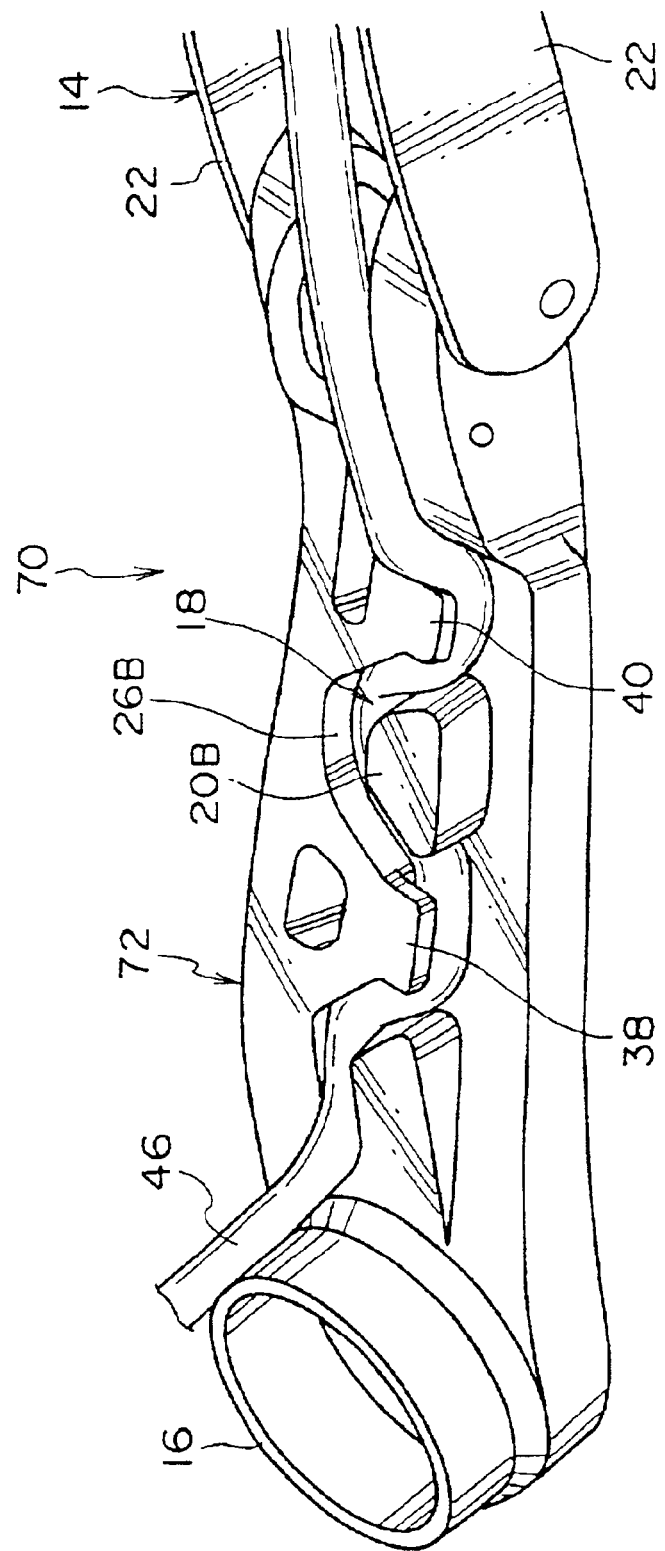
FIG. 8 is a backside view of an arm head according to a second embodiment of the present invention.
Figure 9:
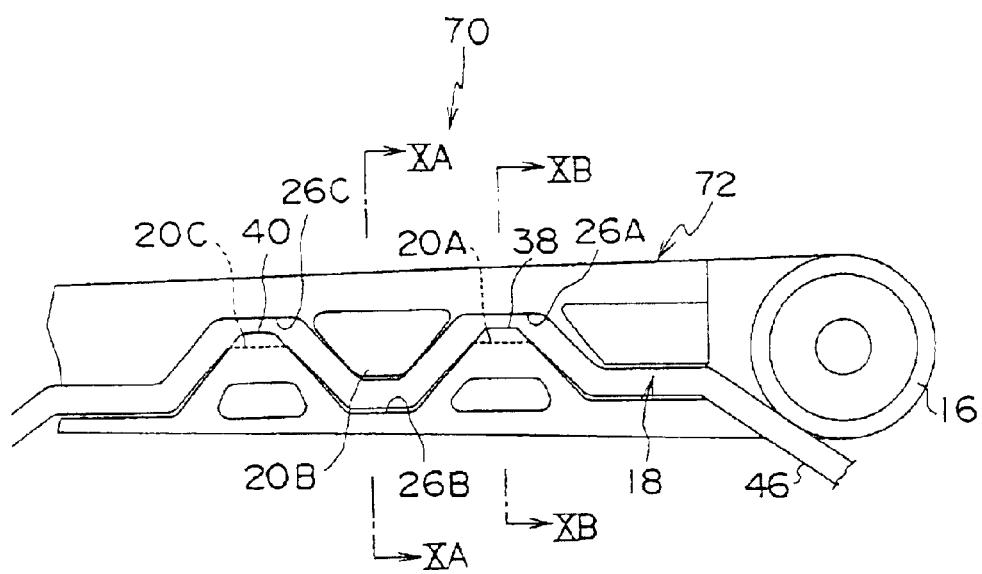
FIG. 9 is a schematic view of groove sidewalls constituting a groove according to the second embodiment.
Figure 10A:
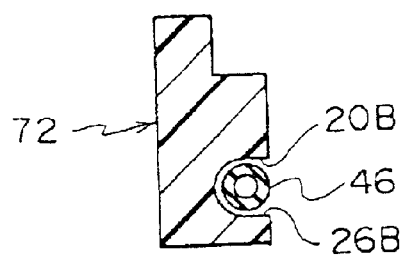
FIG. 10A is a cross sectional view taken along a line XA—XA of FIG. 9.
Figure 10B:
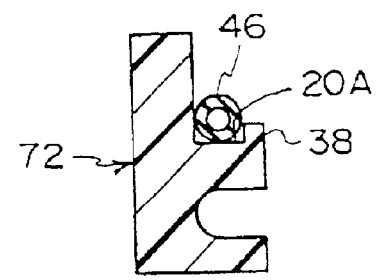
FIG. 10B is a cross sectional view taken along a line XB—XB of FIG. 9.

As shown in FIG. 7, the apparatus is composed of a split die 60, which is composed of an upper die 60A and a lower die 60B, and a slide die 62. The split die 60 can be split into the upper die 60A and the lower die 60B which move generally in opposite depth directions of the groove 18. The upper and lower dies 60A and 60B in contact with each other is provided inside with a cavity 64 into which molten metal or material such as aluminum or resin is injected.

The slide die 62 moves into and from the cavity 64 in a direction different from, preferably, perpendicularly to the moving direction of the split die 60 and, on sliding into the cavity 64 along the split die 60, forms the groove 18 just behind the projection 38 or 40.

The slide die 62 is located outside one of the sidewalls forming the groove 18 and the thickness of the one of the sidewalls at the bottom of the dale portion 26A or 26C is thinner than the thickness of the other of the sidewalls at the bottom of the dale portion 26B. That is, the distance from an outer periphery of the sidewall of the arm head 12 to the bottom of the dale portion 26A or 26C is shorter than a distance from the outer periphery of the sidewall of the arm head 12 to the bottom of the dale portion 26B. The slide die 62 moves across the bottom of the dale portion 26A or 26C toward the top of the hill portion 20A or 20C having the projection 38 or 40 to form the groove 18 just behind the projection 38 or 40.

As mentioned above, a distance during which the slide die 62 moves inside the arm head 12 to form the groove 18 of the undercut portion, that is, an axial length of the hole 19, is the shortest since the slide die 62 moves toward the bottom of the dale portion 26A or 26C opposed to the hill portion 20A or 20C. Accordingly, a moving stroke of the slide die 62 is shorter so that a time required for manufacturing the arm head 12 is shorter.

As mentioned above, as the volume of the hole 19 which is inevitably formed by the movement of the slide die 26 is limited to a smaller value, strength of the arm head 12 is scarcely reduced.

Further, since the slide die 26 is located only on one side of the sidewalls of the arm head 12 and moves into the cavity 64 only from one side thereof, the apparatus of manufacturing the arm head is compact.

Moreover, the hole 19 is provided only on one side of the width direction of the arm head 12 so that the attractive appearance of the arm head 12 can be assured.

Second Embodiment

A windshield wiper device 70 having an arm head 72 according to a second embodiment is described with reference to FIGS. 8 to 10B.

The arm head 72 is provided on a backside thereof with an elongated and undulated groove 18 and projections 38 and 40, similarly to those of the arm head 12 according to the first embodiment.

A part of sidewalls constituting the groove 18, which is a portion corresponding to the hill portion 26A or 26C which is opposed to the hill portion 20A or 20C having the projection 38 or 40 in the first embodiment, is completely removed so that a thickness of the arm head 72 on one width side thereof, which is a side from which the slide die 62 is inserted, is thinner than that on the other width side thereof. Accordingly, the arm head according to the second embodiment is aesthetically pleasing because there are no holes like the holes 19 in the first embodiment, each of which is formed to penetrate one of the side wall of the groove 18 on inserting the slide die 62 into the split die 62 and the cavity 64 to form the groove 18 just behind the projection 38 or 40.

In the arm head 72, the hose 46 is inserted into and firmly held by the groove 18 even if there are no dale portions of one of the sidewall of the groove opposed to hill portions of the other of the sidewall thereof since the hose 46 comes in frictional engagement with the hill portions adjacent in a longitudinal direction of the groove and the projection 38 or 40 prevents the hose from slipping out of the groove 18 when the hose 46 is pulled in the longitudinal direction of the arm head 72 by the generated force.

Third Embodiment

Figure 11:
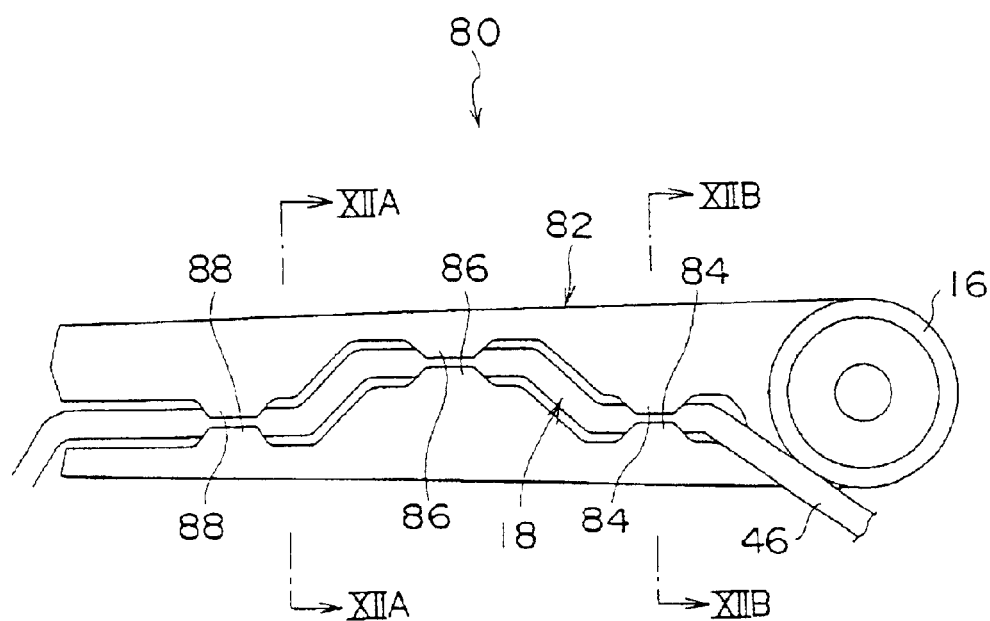
FIG. 11 is a backside view of an arm head according to a third embodiment of the present invention.
Figure 12A:
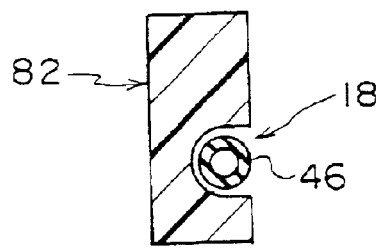
FIG. 12A is a cross sectional view taken along a line XIIA—XIIA of FIG. 11.

A windshield wiper device 80 having an arm head 82 according to a third embodiment is described with reference to FIGS. 11 to 12B.

The arm head 82 is provided with an elongated and undulated groove 18, similarly to that of the first embodiment. The arm head 82 is further provided with plural pairs of projections 84, 86 and 88 which are formed on tops of the hill portions 20A, 20B and 20C and on bottoms of the dale portions 26A, 26B and 26C, respectively. Each pair of projections 84, 86 or 88 extend in a width direction of the groove 18 to overhang the groove 18 and a gap M is formed between free end of the projections 84, 86 or 88. The gap M is narrower than the diameter of the hose 46.

Since the pair of projections 84, 86 or 88 protrude respectively out of the both sidewalls constituting the groove 18, each length of the projections 84, 86 or 88 in a width direction of the groove 18 is shorter so that each strength of the projections 84, 86 or 88 is stronger, which is hardly damaged.

Figure 12B:
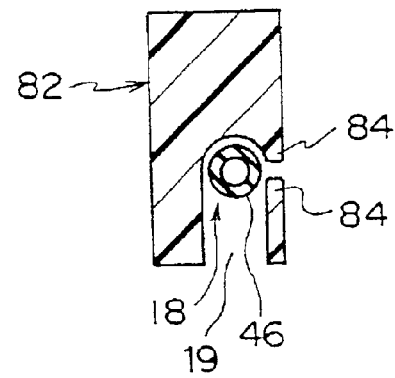
FIG. 12B is a cross sectional view taken along a line XIIB—XIIB of FIG. 11.

Further, as shown in FIG. 12B, the groove 18 just behind each pair of the projections 84, 86 or 88 can be formed by the slide die 62 sliding from one width side of the groove 18.

What is claimed is:

1. A windshield wiper device for wiping a windshield glass with a wiper blade via a wiper arm to be driven by a pivot shaft and a washer nozzle attached on at least one of the wiper blade and the wiper arm, the wiper arm comprising:

an arm head having one end fixed to the pivot shaft to rotate about an axis of the pivot shaft, the arm head being provided with an undulated groove defined by groove sidewalls having at least first and second hill portions that protrude opposite to each other in a width direction of the arm head and that are located adjacent to each other in a longitudinal direction thereof;

an arm element having one end pivotally connected to another end of the arm head and another end pivotally connected with the wiper blade; and a hose arranged along the arm head for connecting with the washer nozzle to deliver washer liquid thereto, wherein a length between tops of the first and second hill portions in the width direction of the arm head is shorter than a diameter of the hose, and the hose is accommodated in and held by the groove, the groove sidewalls further have a first dale portion that is opposed to the first hill portion in the width direction of the arm head and continuously adjacent to the second hill portion in the longitudinal direction thereof, at least one of the tops of the first and second hill portions is provided at an upper surface thereof with a projection protruding in the width direction of the arm head so as to overhang the groove, a height in a thickness direction of the arm head from an outer surface of the projection to a bottom surface of the groove opposed to an inner surface the projection is shorter than a height in a thickness direction of the arm head from an outer surface of the first dale portion opposed to the projection in a width direction of the arm head to the bottom of the groove.

2. A windshield wiper device according to claim 1, wherein the projection is integrally provided with the arm head as a single piece.

3. A windshield wiper device according to claim 2, wherein the projection is provided in the top of the first hill portion and a length between a free end of the projection and a bottom of the first dale portion in a width direction of the arm head is shorter than the diameter of the hose.

4. A windshield wiper device according to claim 3, wherein a width of the groove just behind the projection is longer than the diameter of the hose.

5. A windshield wiper device for wiping a windshield glass with a wiper blade via a wiper arm to be driven by a pivot shaft and a washer nozzle attached on at least one of the wiper blade and the wiper arm, the wiper arm comprising:

an arm head having one end fixed to the pivot shaft to rotate about an axis of the pivot shaft, the arm head being provided with an undulated groove defined by groove sidewalls having at least first and second hill portions that protrude opposite to each other in a width direction of the arm head and are located adjacent to each other in a longitudinal direction thereof;

an arm element having one end pivotally connected to another end of the arm head and another end pivotally connected with the wiper blade; and a hose arranged along the arm head for connecting with the washer nozzle to deliver washer liquid thereto, wherein a length between tops of the first and second hill portions in the width direction of the arm head is shorter than a diameter of the hose and the hose is accommodated in and held by the groove, at least one of the tons of the first and second hill portions is provided at an upper surface thereof with a projection protruding in the width direction of the arm head so as to overhang the groove, the groove sidewalls further have a first dale portion that is opposed to the first hill portion in the width direction of the arm head and continuously adjacent to the second hill portion in the longitudinal direction thereof, a distance from the one of the tops of the first and second hill portions having the projection to a periphery of the arm head in a width direction thereof is shorter than that from the other one of the tops of the first and second hill portions not having the projection to another periphery of the arm head in a width direction thereof.

6. A windshield wiper device for wiping a windshield glass with a wiper blade via a wiper arm to be driven by a pivot shaft and a washer nozzle attached on at least one of the wiper blade and the wiper arm, the wiper arm comprising:

an arm head having one end fixed to the pivot shaft to rotate about an axis of the pivot shaft, the arm head being provided with an undulated groove defined by groove sidewalls having at least first and second hill portions that protrude opposite to each other in a width direction of the arm head and are located adjacent to each other in a longitudinal direction thereof;

an arm element having one end pivotally connected to another end of the arm head and another end pivotally connected with the wiper blade; and a hose arranged along the arm head for connecting with the washer nozzle to deliver washer liquid thereto, wherein a length between tops of the first and second hill portions in the width direction of the arm head is shorter than a diameter of the hose and the hose is accommodated in and held by the groove, the groove sidewalls further have a first dale portion that is opposed to the first hill portion in the width direction of the arm head and continuously adjacent to the second hill portion in the longitudinal direction thereof, at least one of the tops of the first and second hill portions is provided at an upper surface thereof with a projection protruding in the width direction of the arm head so as to overhang the groove, the projection is provided in the ton of the first hill portion and a length between a free end of the projection and a bottom of the first dale portion in a width direction of the arm head is shorter than the diameter of the hose, and the arm head is provided with a through-hole opened from the groove just behind the projection to a periphery of the first dale portion in a width direction of the arm head.

7. A windshield wiper device according to claim 6, wherein the through-hole extends substantially perpendicularly to an axis of the pivot shaft.

8. A windshield wiper device for wiping a windshield glass with a wiper blade via a wiper arm to be driven by a pivot shaft and a washer nozzle attached on at least one of the wiper blade and the wiper arm, the wiper arm comprising;

an arm head having one end fixed to the pivot shaft to rotate about an axis of the pivot shaft, the arm head being provided with an undulated groove defined by groove sidewalls having at least first and second hill portions that protrude opposite to each other in a width direction of the arm head and are located adjacent to each other in a longitudinal direction thereof;

an arm element having one end pivotally connected to another end of the arm head and another end pivotally connected with the wiper blade; and a hose arranged along the arm head for connecting with the washer nozzle to deliver washer liquid thereto, wherein a length between tops of the first and second hill portions in the width direction of the arm head is shorter than a diameter of the hose and the hose is accommodated in and held by the groove, the groove sidewalls further have a first dale portion that is opposed to the first hill portion in the width direction of the arm head and continuously adjacent to the second hill portion in the longitudinal direction thereof, the groove sidewalls further have second and third dale portions that are opposed to the second and third hill portions in the width direction of the arm head, respectively, and continuously adjacent to the first hill portion on opposite sides in the longitudinal direction thereof, respectively, the groove side walls further have a third hill portion protruding opposite to the first hill portion in a width direction of the arm head and being located continuously adjacent to the first dale portion on a side opposite to the second hill portion in the longitudinal direction thereof, and at least one of a pair of the top of the first hill portion and a bottom of the first dale portion, a pair of the top of the second hill portion and a bottom of the second dale portion and a pair of the top of the third hill portion and a bottom of the third dale portion are provided at upper surfaces thereof with projections protruding opposite to each other in the width direction of the arm head so as to overhang the groove.

9. A windshield wiper device according to claim 8, wherein a length between free ends of the projections opposed to each other is shorter than the diameter of the hose.

10. A windshield wiper device according to claim 9, wherein a width of the groove just behind the projection is longer than the diameter of the hose.

11. A windshield wiper device for wiping a windshield glass with a wiper blade via a wiper arm to be driven by a pivot shaft and a washer nozzle attached on at least one of the wiper blade and the wiper arm, the wiper arm comprising:

an arm head having one end fixed to the pivot shaft to rotate about an axis of the pivot shaft, the arm head being provided with an undulated groove defined by groove sidewalls having at least first and second hill portions that protrude opposite to each other in a width direction of the arm head and are located adjacent to each other in a longitudinal direction thereof;

a retainer having one end pivotally connected to another end of the arm head to enable a given rotation in a direction substantially perpendicular to the windshield glass;

an arm piece having one end fixed to another end of the retainer and another end pivotally connected with the wiper blade; and a hose arranged along the arm head and the retainer for connecting with the washer nozzle to deliver washer liquid thereto, wherein a length between tops of the first and second hill portions in the width direction of the arm head is shorter than a diameter of the hose and the hose is accommodated in and held by the groove, at least one of the tops of the first and second hill portions is provided at an upper surface thereof with a projection protruding in the width direction of the arm head so as to overhang the groove, and a distance from the one of the tops of the first and second hill portions having the projection to a periphery of the arm head in a width direction thereof is shorter than that from the other one of the tops of the first and second hill portions not having the projection to another periphery of the arm head in a width direction thereof.

12. A windshield wiper device for wiping a windshield glass with a wiper blade via a wiper arm to be driven by a pivot shaft and a washer nozzle attached on at least one of the wiper blade and the wiper arm, the wiper arm comprising:

an arm head having one end fixed to the pivot shaft to rotate about an axis of the pivot shaft, the arm head being provided with an undulated groove defined by groove sidewalls having at least first and second hill portions that protrude opposite to each other in a width direction of the arm head and are located adjacent to each other in a longitudinal direction thereof;

an arm element having one end pivotally connected to another end of the arm and another end pivotally connected with the wiper blade; and a hose arranged along the arm head for connecting with the washer nozzle to deliver washer liquid thereto, wherein a length between tops of the first and second hill portions in the width direction of the arm head is shorter than a diameter of the hose and the hose is accommodated in and held by the groove, and at least one of the tops of the first and second hill portions is provided at an upper surface thereof with a projection protruding in the width direction of the arm head so as to overhang the groove, the projection being integrally provided with the arm head as a single piece.

13. A windshield wiper device according to claim 12, wherein a distance from the one of the tops of the first and second hill portions having the projection to a periphery of the arm head in a width direction thereof is shorter than that from the other one of the tops of the first and second hill portions not having the projection to another periphery of the arm head in a width direction thereof.

* * * * *

UNITED STATES PATENT AND TRADEMARK OFFICE
CERTIFICATE OF CORRECTION

PATENT NO. : 6,804,854 B2
DATED : October 19, 2004
INVENTOR(S) : Takashi Hasegawa et al.

It is certified that error appears in the above-identified patent and that said Letters Patent is hereby corrected as shown below:

Title page,
Item [75], Inventors, should read -- Takashi Hasegawa, Kosai (JP); Atsuo Suzuki, Hamakita (JP); Kazuhide Kuno, Hamamatsu (JP); Tomonori Iso, Koga (JP) --

Signed and Sealed this

Twenty-sixth Day of April, 2005

JON W. DUDAS
*Director of the United States Patent and Trademark Office*